United States Patent
Crettenand

(10) Patent No.: US 12,540,409 B2
(45) Date of Patent: Feb. 3, 2026

(54) ELECTROCHEMICAL REACTOR

(71) Applicant: RedElec Technologie SA, Riddes (CH)

(72) Inventor: David Crettenand, Riddes (CH)

(73) Assignee: RedElec Technologie SA, Riddes (CH)

( * ) Notice: Subject to any disclaimer, the term of this patent is extended or adjusted under 35 U.S.C. 154(b) by 853 days.

(21) Appl. No.: 17/296,425

(22) PCT Filed: Dec. 13, 2019

(86) PCT No.: PCT/EP2019/085183
§ 371 (c)(1),
(2) Date: May 24, 2021

(87) PCT Pub. No.: WO2020/120776
PCT Pub. Date: Jun. 18, 2020

(65) Prior Publication Data
US 2022/0010438 A1    Jan. 13, 2022

(30) Foreign Application Priority Data

Dec. 14, 2018   (EP) .................................... 18212756

(51) Int. Cl.
*C25B 9/40*       (2021.01)
*C25B 3/09*       (2021.01)
(Continued)

(52) U.S. Cl.
CPC .................. *C25B 9/40* (2021.01); *C25B 3/09* (2021.01); *C25B 3/25* (2021.01); *C25B 9/63* (2021.01);
(Continued)

(58) Field of Classification Search
CPC .... C25B 9/40; C25B 9/43; C25B 9/47; C25B 11/037
See application file for complete search history.

(56) References Cited

U.S. PATENT DOCUMENTS

| | | |
|---|---|---|
| 4,118,305 A | 10/1978 | Oloman et al. |
| 5,879,522 A | 3/1999 | Shaaban et al. |

(Continued)

FOREIGN PATENT DOCUMENTS

WO   2007/147283 A2   12/2007

OTHER PUBLICATIONS

Electrode Materials in Modern Organic Electrochemistry. Angew. Chem. Int. Ed. 2020, 59, 18866-18884. (Year: 2020).*

(Continued)

*Primary Examiner* — Ciel P Contreras
(74) *Attorney, Agent, or Firm* — Sughrue Mion, PLLC

(57) ABSTRACT

An electrochemical reactor comprising an electrolyte compartment wherein at least one of the side walls of the electrolyte compartment is an electrode and an opposite side wall comprises a separator element. Further there is a plurality of electrically conductive granules forming a working electrode for a electrochemical main reaction in the electrolyte compartment and enclosed in the electrolyte compartment. The granules comprise a first material exhibiting at least a first activation overpotential for an electrochemical side reaction within a distance d from the separator element. The electrochemical reactor comprises a spacer element for maintaining the granules at least at a distance d from the separator element on the electrolyte-facing side of the separator element. The spacer element is electrically conductive and comprises a second material exhibiting a second activation overpotential for the electrochemical side reaction within a distance d from the separator element and is larger than the first activation overpotential.

2 Claims, 2 Drawing Sheets

(51) Int. Cl.
    *C25B 3/25*           (2021.01)
    *C25B 9/63*           (2021.01)
    *C25B 11/037*       (2021.01)
    *C25B 13/02*         (2006.01)
    *C25B 13/05*         (2021.01)
    *C25B 15/08*         (2006.01)
    *C25B 1/04*           (2021.01)

(52) U.S. Cl.
    CPC ............ *C25B 11/037* (2021.01); *C25B 13/02* (2013.01); *C25B 13/05* (2021.01); *C25B 15/08* (2013.01); *C25B 1/04* (2013.01)

(56) References Cited

U.S. PATENT DOCUMENTS

| | | | |
|---|---|---|---|
| 6,217,728 B1 * | 4/2001 | Lehmann | C25B 9/23 204/266 |
| 2005/0121336 A1 | 6/2005 | Marte et al. | |
| 2009/0308757 A1 | 12/2009 | Crettenand | |
| 2018/0138569 A1 | 5/2018 | Mulder | |

OTHER PUBLICATIONS

International Search Report for PCT/EP2019/085183 dated Feb. 27, 2020 [PCT/ISA/210].
Written Opinion for PCT/EP2019/085183 dated Feb. 27, 2020 [PCT/ISA/237].

\* cited by examiner

ELECTROCHEMICAL REACTOR

CROSS REFERENCE TO RELATED APPLICATIONS

This application is a National Stage of International Application No. PCT/EP2019/085183 filed Dec. 13, 2019, claiming priority based on European Patent Application No. 18212756.3 filed Dec. 14, 2018.

TECHNICAL FIELD

The present invention relates to an electrochemical reactor for carrying out an electrochemical main reaction such as for example the direct oxidation or reduction of vat dyes.

PRIOR ART

The use of vat and sulphur dyes for printing and colouring of textile fibres has until now been associated with the application of over-stoichiometric reduction-agent amounts (relative to the dye amount to be reduced). The reduction of the vat dyes conventionally takes place in alkaline (pH>9), aqueous solutions with sodium dithionite (hydrosulfite) or reduction agents derived therefrom (e.g. RONGALIT C, BASF) in conjunction with wetting agents and complexing agents.

The reduction agents suitable for reduction of vat dyes have a redox potential, under the conditions necessary for the vatting of the dyes, of −400 mV to −1000 mV. Both the application of hydrosulphite and of thiourea dioxide lead to a high sulphite or sulphate loading of the effluent: These salt loads are on the one hand toxic, and on the other hand are corrosive and lead to the destruction of concrete conduits etc. . . . . A further problem of the sulphate load in the effluent arising from the sulphite is the hydrogen sulphide formation in the sewer system pipes, caused by anaerobic organisms.

Because of the above-mentioned problems, processes and electrochemical reactors for reduction-agent free vatting of dye were developed.

WO 2007147283 A2 discloses an electrochemical reactor which can be run without using any reduction agents and in which the granules, which may for example be made from graphite, form the working electrode material for the main electrochemical reaction, e.g. the direct reduction of a vat dye. In general, the granules of the working electrode may be in the form of a fluidized bed of granules or a packed bed or dragged bed of granules, and the thus formed bed of granules extends from the electrode on one side towards the separator membrane and it is held in place by either structural means or by the flow of the liquid electrolyte.

U.S. Pat. No. 4,118,305 B1 discloses an electrochemical reactor which comprises a barrier wall made of an electrically insulating material.

US2005/121336 A1 discloses a method and apparatus for the electrocatalytic hydrogenation of vat or sulphide dyes in aqueous solutions, where the electrode particles are retained between sieves made of a undisclosed material.

An exemplary main electrochemical reaction that can be carried out in an electrochemical reactor is the reduction of indigo in aqueous suspension towards an aqueous solution of leuco-indigo using a dragged or packed bed of graphite granules as working electrode.

In all areas of technology efficiency is key to commercial success, and the tendency is no different in the field of electrochemical reactors. Electrochemical reactors can be improved in performance by for example increasing the yield, selectivity and reaction rate. In electrochemical reactors, a straightforward option to increase the reaction rate is that of increasing the current flowing across the electrochemical reactor. However, increasing the current has its drawbacks in that it leads to unwanted side reactions, i.e. a drop in selectivity, thereby at least partially lowering the gain in rate achieved by the increase in current.

At high currents, those granules of the working electrode which are in proximity of the separator membrane enable one or more unwanted side reactions due to a dramatic increase in local electrode potential (difference between local potential of the working electrode material and the local potential of the aqueous electrolyte). Because these side reactions result in reaction products that further hinder the performance of the electrochemical reactor, the current cannot be increased further.

One of the encountered side reactions in proximity of the separator membrane is the formation of hydrogen and/or oxygen by water electrolysis in the region on the granules of the working electrode, when using aqueous electrolytes.

There thus exists a desire to provide an electrochemical reactor which may be operated at higher reaction rates, higher conversion and/or selectivity.

SUMMARY OF THE INVENTION

It is therefore one of the objects of the present invention to generally provide an improved electrochemical reactor which has a high efficiency, a high throughput, and which is easy to maintain and manufacture.

It is an object of the present invention to provide an electrochemical reactor for carrying out an electrochemical main reaction comprising
- at least one electrolyte compartment for receiving an aqueous or non-aqueous electrolyte, wherein at least one of the side walls of said electrolyte compartment is an electrode or a feeder electrode and an opposite side wall comprises or consist of a separator element,
- a plurality of electrically conductive granules forming a working electrode for the electrochemical main reaction in the electrolyte compartment and enclosed in the electrolyte compartment, said granules comprising or consisting of a first material exhibiting at least a first activation overpotential for an electrochemical side reaction within a distance d from the separator element, characterized in that the electrochemical reactor further comprises
- a spacer element for maintaining the plurality of electrically conductive granules at least at a distance d from the separator element on at least the electrolyte-facing side of the separator element, wherein the spacer element is electrically conductive and wherein the spacer element comprises or consists of a second material exhibiting a second activation overpotential for the electrochemical side reaction within a distance d from the separator element and wherein the second activation overpotential is larger than the first activation overpotential.

The person skilled in the art will understand the term "larger", in the context of the present invention, as referring to the numeric value of an overpotential. Thus, larger may mean either "more positive" or "more negative" depending on the oxidative or reductive nature of the reaction being carried out in the electrolyte compartment of the reactor.

It is further an object of the present invention to provide a method for carrying out an electrochemical main reaction in an electrochemical reactor, said electrochemical reactor comprising at least one electrolyte compartment receiving an aqueous or a non-aqueous electrolyte, wherein at least one of the side walls of said electrolyte compartment is an electrode or a feeder electrode and an opposite side wall comprises or consist of a separator element, a plurality of electrically conductive granules forming a working electrode for the electrochemical main reaction in the electrolyte compartment and enclosed in the electrolyte compartment, said granules comprising or consisting of a first material exhibiting at least a first activation overpotential for an electrochemical side reaction within a distance d from the separator element, characterized in that the electrochemical reactor further comprises a spacer element for maintaining the plurality of electrically conductive granules at least at a distance d from the separator element on at least the electrolyte-facing side of the separator element, wherein the spacer element is electrically conductive and wherein the spacer element comprises or consists of a second material exhibiting a second activation overpotential for the electrochemical side reaction within a distance d from the separator element and wherein the second activation overpotential is larger than the first activation overpotential.

It is further an object of the present invention to provide the use of an electrochemical reactor as described above for carrying out an electrochemical main reaction, said electrochemical reactor comprising, at least one electrolyte compartment for receiving an aqueous electrolyte, wherein at least one of the side walls of said electrolyte compartment is an electrode or a feeder electrode and an opposite side wall comprises or consist of a separator element, a plurality of electrically conductive granules forming a working electrode for the electrochemical main reaction in the electrolyte compartment and enclosed in the electrolyte compartment, said granules comprising or consisting of a first material exhibiting at least a first activation overpotential for an electrochemical side reaction within a distance d from the separator element, characterized in that the electrochemical reactor further comprises a spacer element for maintaining the plurality of electrically conductive granules at least at a distance d from the separator element on at least the electrolyte-facing side of the separator element, wherein the spacer element is electrically conductive and wherein the spacer element comprises or consists of a second material exhibiting a second activation overpotential for the electrochemical side reaction within a distance d from the separator element and wherein the second activation overpotential is larger than the first activation overpotential.

The electrochemical reactor of the present invention thus provides for a spacer element, which spacer element keeps, in spatial terms, the electrically conductive granules forming the working electrode from contacting the separator element and moreover from moving into proximity of the separator element where otherwise a side reaction would occur. Conversely, the electrically conductive granules forming the working electrode are kept in a part of the electrolyte compartment where the local electrode potential is such that it favours the main electrochemical reaction. On the other hand, the spacer element is made of electrochemically inert material being more inert than the working electrode material while being electrically conductive, which does not undergo an unwanted side reaction, even when in proximity (i.e. within a distance d) of the separator element where local electrode potential increases in general. While the spacer element provides for the spatial partitioning of the plurality of electrically conductive granules, the spacer element at the same time provides for mechanical protection against the plurality of electrically conductive granules which may be mechanically pressed against the separator element and impact the separator element, which in many cases is a thin membrane that may be damaged, and even pierced, after repeated impacts. This is a particular a problem in electrochemical reactors featuring a dragged bed of a plurality of electrically conductive granules and where the direction of flow of the aqueous or non-aqueous electrolyte in the electrolyte compartment is periodically inverted during operation of the electrochemical reactor.

In a preferred embodiment of electrochemical reactor according to the present invention, both the spacer element and the granules of the working electrode are made from carbon, but from different carbon allotropes each exhibiting different overpotential for the electrochemical side reaction.

In a preferred embodiment of electrochemical reactor according to the present invention, the spacer element is in the form of a textile. A textile may be for example a woven or non-woven textile, or a knit textile, or combinations thereof. A textile has the advantage of being able to cover the separator element while at the same providing a certain porosity for mass transfer between the surface and/or the region within a distance d of the surface of the separator element and the remaining part of the electrolyte compartment. It is understood that the mesh size of the textile is chosen in dependence of the size of the working electrode granules and such that the mesh size prevents the working electrode granules from entering or crossing the bulk of the textile.

In a preferred embodiment of electrochemical reactor according to the present invention, the spacer element is in the form of a honeycomb, and is preferably from graphite. It is understood that the hole size of the textile is chosen in dependence of the size of the working electrode granules and such that the hole size prevents the working electrode granules from entering or crossing the bulk of the honeycomb.

In a preferred embodiment of electrochemical reactor according to the present invention, the spacer element is in the form of a foamed electrochemically inert material such as open-cell foam. Open-cell foam has the advantage of providing a very high porosity per unit volume. It is understood that the pore size of the foam is chosen in dependence of the size of the working electrode granules and such that the pore size prevents the working electrode granules from entering or crossing the bulk of the foam.

In a preferred embodiment of electrochemical reactor according to the present invention, the second material of the spacer element exhibits elasticity. The spacer element, when displaying elasticity, further eases the manufacture of the electrochemical reactor according to the present invention in that during the assembly the electrochemical reactor, the amount of electrically conductive granules that is introduced into the electrolyte compartment must not be controlled to the level of one or two granules. If all walls of the electrolyte compartment are rigid, then an excess of electrically conductive granules will lead to breakage of individual granules once the electrolyte compartment is assembled, which is especially unwanted when the granules are coated. On the other hand, a too small amount of granules will eventually allow the granules to move within the electrolyte compartment which may be unwanted in the case of a dragged bed electrode or packed bed electrode. When using an elastic spacer element, the spacer element can fix the electrically conductive granules in place because of its tendency to expand after being compressed during assembly of the electrochemical cell. Because of its elasticity, the electrolyte compartment can assembled without breakage of "excess" granules. Furthermore, an elastic spacer element acts as a protective cushion for the separator element. Carbon felt, in particular graphite felt exhibits elasticity. Also when the granules of a dragged bed electrode change location inside the electrolyte compartment, for example after flow inversion, they are "stuck" in place by the elastic spacer element once they hit the bottom/top and thus do not form a tightly packed bed but an irregularly packed bed, which results in less electrolyte pressure drop across the bed.

In a preferred embodiment of electrochemical reactor according to the present invention, the second material exhibiting second activation overpotential is carbon, more preferably graphite. A carbon spacer element has the advantage of requiring less expenditure than other materials that are electrically conductive and electrochemically inert such as noble metals. In addition carbon, especially when formed into a filament or fibre, displays excellent mechanical properties, which in turn leads to flexible and elastic textiles such as woven or non-wovens, in particular felts. Noble metals, on the contrary, are not as flexible or elastic.

In a preferred embodiment of electrochemical reactor according to the present invention, the electrochemical side reaction is a reaction resulting in the formation of a gas or a solid, preferably is either one of the half reactions of electrolysis of water. The electrochemical reactor according to the present invention is in particular less susceptible to the formation of hydrogen on or within proximity of the separator membrane, which reduces the effective area for current and increases the local current density or local over potential.

In a preferred embodiment of electrochemical reactor according to the present invention, the electrochemical main reaction is the reduction of indigo to leuco-indigo. The production of leuco-indigo is one of the most important reaction in the field of textiles and improvements in the efficiency of this reaction, which can be achieved by the electrochemical reactor according to the present invention, constitutes a significant competitive advantage.

In a preferred embodiment of electrochemical reactor according to the present invention, the separator element is a membrane, in particular a fluoropolymer membrane. In particular, the membrane has the advantage of being cost-effective and but is not stable in mechanical terms. In the electrochemical reactor according to the present invention, the membrane is protected from mechanical damage resulting for example from the impact of granules during a electrolyte flow inversion and can therefore be used with more confidence.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
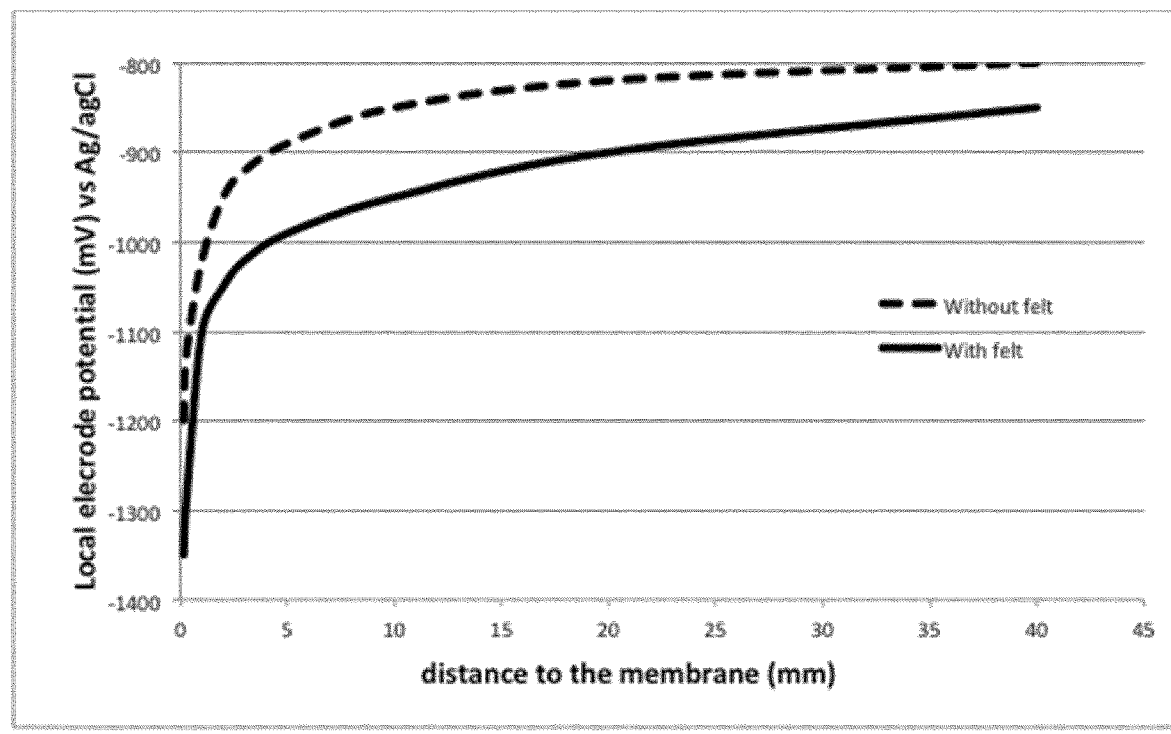
FIG. 1 shows the evolution of local electrode potential measured near to the separator, distance 1 mm from the separator, in mV vs Ag/AgCl in relation to the distance d in mm to the separator membrane in an electrochemical cell described as comparative setup below for a voltage of about 2.6 V/current of 20 A (dashed line), which corresponds to the maximum settings at which the electrochemical cell may be safely run when no spacer element is used and the working electrode is formed of dragged bed of carbon granules and in an electrochemical cell described as inventive setup below for a voltage of about 3.3 V/current of about 36 A (solid line), which corresponds to the maximum settings at which the electrochemical cell may be run when a 5 mm spacer element is used and the working electrode is formed of carbon granules. The electrochemical reaction that should be favoured on the working electrode (cathode) is the reduction of indigo to leuco-indigo (main reaction). The electrochemical reaction that should be avoided is the production of hydrogen (side reaction).
Figure 2:
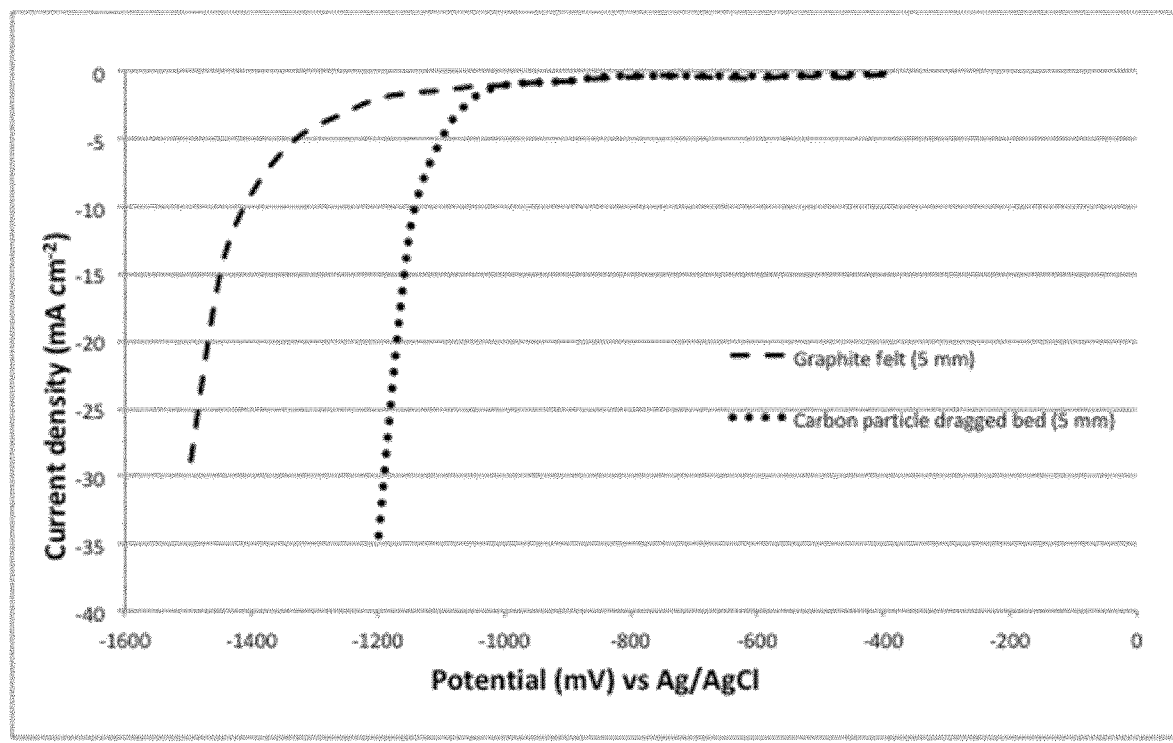
FIG. 2 shows the evolution of the current density (ratio related to membrane surface and not to electrode surface) in relation to the local electrode potential measured near to the separator, distance 1 mm from the separator, in mV vs Ag/AgCl. The aqueous catholyte is composed of 1.3 M NaOH. The aqueous anolyte is composed of 3 M NaOH. The main electrochemical reaction will be the production of hydrogen. The figure shows that the graphite felt, as an electrode, is electrochemically inert for the production of hydrogen in comparison to the dragged bed of carbon particle as an electrode which is more electrochemically active for the production of hydrogen. Hydrogen is the side reaction, which should be avoided in the conditions shown in FIG. 1.
Figure 3:
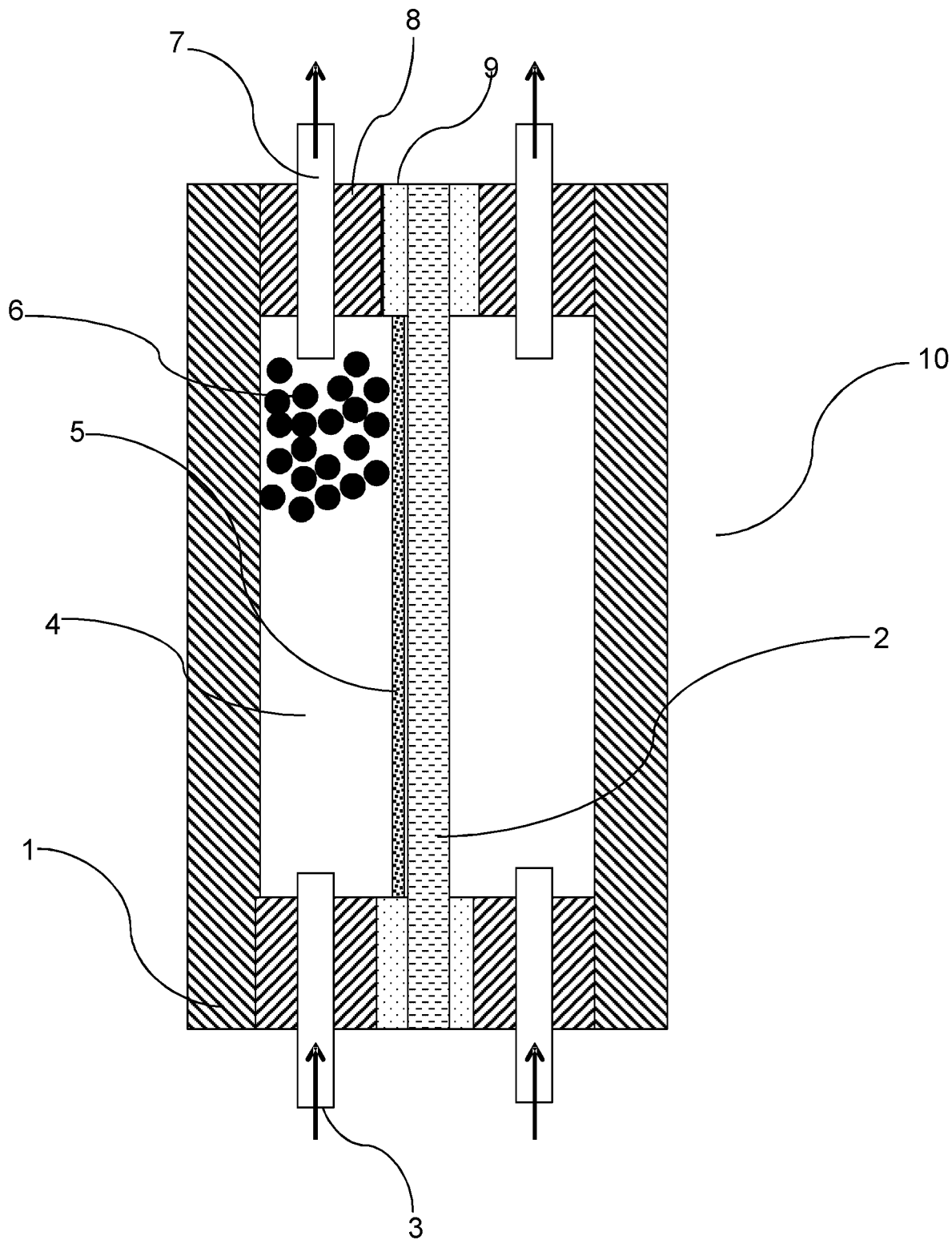
FIG. 3 shows a cross-section of an electrochemical reactor (10) according to the present invention, where working electrode granules (6) are dragged by the flow of electrolyte (arrows), which enters through the electrolyte inlet (3) and exits through the electrolyte outlet (7), to the upper region of the electrolyte compartment (4), which electrolyte compartment is defined by the electrode (1) facing the separator element (2) and the frame (8) between them. The spacer element (5) is arranged in the electrolyte compartment on the side of the separator element (2) facing the electrolyte compartment comprising the working electrode granules (6). Gaskets (9) are used to ensure that the electrochemical reactor is tight to liquids.

It is an object of the present invention to provide an electrochemical reactor for carrying out an electrochemical main reaction, or a method for carrying out an electrochemical main reaction in said electrochemical reactor, comprising
at least one electrolyte compartment for receiving an aqueous electrolyte, wherein at least one of the side walls of said electrolyte compartment is an electrode and an opposite side wall comprises or consist of a separator element,
a plurality of electrically conductive granules forming a working electrode for the electrochemical main reaction in the electrolyte compartment and enclosed in the electrolyte compartment, said granules comprising or consisting of a first material exhibiting at least a first activation overpotential for an electrochemical side reaction within a distance d from the separator element, characterized in that the electrochemical reactor further comprises a spacer element for maintaining the plurality of electrically conductive granules at least at a distance d from the separator element on at least the electrolyte-facing side of the separator element where the working electrode granules are comprised, wherein the spacer element is electrically conductive and wherein the spacer element comprises or consists of a second material exhibiting a second activation overpotential for the electrochemical side reaction within a distance d from the separator element and wherein the second activation overpotential is larger than the first activation overpotential.

In a preferred embodiment, the second activation overpotential is larger, i.e. more negative or more positive, than the first activation overpotential by at least 100 mV, preferably by at least 200 mV or 200 mV to 400 mV, more preferably by at least 250 mV or 200 mV to 350 mV.

The electrochemical reactor according to the present invention is not limited to a particular application such as the electrochemical reduction or oxidation of vat dyes. Nonetheless, the electrochemical reduction of vat dyes is an application where the benefits of using electrochemical reactors instead of aggressive chemical agents results in both environmental and economic benefits, especially when the electrochemical reactor can be run at higher efficiency as is the case in the electrochemical reactor of the present invention.

In a preferred embodiment, the spacer element may be formed from any suitable electrically conductive material such as metals, in particular noble metals or may be formed from a non-metallic material that is electrically conductive. In a more preferred embodiment, the spacer element is formed from a non-metallic material that is electrically conductive, such as carbon, and in particular from graphite. Alternatively, the non-metallic material may be a polymer such as carbon filled fluoropolymer. An example of such polymer such as carbon filled fluoropolymer is graphite filled PTFE.

In a preferred embodiment, the plurality of electrically conductive granules may fill the entire the electrolyte compartment or may fill a part of the electrolyte compartment.

In a preferred embodiment, the spacer element for maintaining the plurality of electrically conductive granules at least at a distance d from the separator element shields essentially the entire surface of the electrolyte-facing side of the separator element where the working electrode granules are comprised. This may be of particular advantage in an electrochemical cell in which a dragged bed of working electrode granules is used and in which the direction of flow of the electrolyte in the electrolyte compartment is periodically inverted during operation of the electrochemical reactor. In general, the electrolyte compartment is then filled in part with electrically conductive granules. Such separator element configuration may nonetheless be used in a packed bed electrochemical reactor, for example when the entire electrolyte compartment is essentially filled up with electrically conductive granules of the working electrode.

In a preferred embodiment, the spacer element for maintaining the plurality of electrically conductive granules at least at a distance d from the separator element shields an upper and/or lower surface of the electrolyte-facing side of the separator element where the working electrode granules are comprised. This may be of advantage in terms of material used in in an electrochemical cell in which a dragged bed of working electrode granules is used and in which the direction of flow of the electrolyte in the electrolyte compartment is periodically inverted during operation of the electrochemical reactor.

The aqueous electrolyte may be an aqueous solution or an aqueous dispersion. In the case of a vat dye such as for example indigo, the electrolyte is an aqueous dispersion or solution of the vat dye such as for example an aqueous dispersion of indigo.

In the case where the aqueous electrolyte is an aqueous solution or an aqueous dispersion of a vat dye, the aqueous electrolyte preferably has a basic pH.

The non-aqueous electrolyte may be a non-aqueous solution or a non-aqueous dispersion.

The plurality of electrically conductive granules forming a working electrode may be formed by granules having a diameter of at least or of from 0.25 to 1.5 mm, preferably of from 0.5 mm to 1 mm.

It is understood that the spacer element, in its various forms, is chosen such that the porosity of the spacer element is such that it does not allow the granules of the working electrode to penetrate into the bulk of the spacer element.

In a much preferred embodiment of the electrochemical reactor for carrying out an electrochemical main reaction, the at least one electrolyte compartment for receiving an aqueous or non-aqueous electrolyte is formed by an electrode forming one side wall of said electrolyte compartment and a separator fluoropolymer membrane forming an opposite side wall, where the said opposed side walls are connected through a polymer or ceramic frame and the working electrode if formed by granules of anode-grade coke granules for the electrochemical reduction of a vat dye such as indigo enclosed in the electrolyte compartment and the electrochemical reactor further comprises a graphite felt spacer element on the electrolyte-facing side of the fluoropolymer membrane for maintaining the anode-grade coke granules at a distance of at least 2 mm or 2 mm to 10 mm; or at least 5 mm or of from 5 mm to 10 mm, from the fluoropolymer membrane separator element.

In an embodiment, the electrochemical reactor according to the present invention, can be assembled by placing a side wall comprising or consisting of a separator element in a horizontal plane, fastening the connecting frame to the separator element such as to form a recess, filling the recess essentially to the brim with a plurality of electrically conductive granules that will form the working electrode, and fastening a side wall forming an electrode.

An electrochemical reactor is capable of carrying out several electrochemical reactions, depending on the chemical nature of the electrolyte, and on the voltage and/or current applied. Exemplary reactions include the reduction or oxidation of vat dyes. A common vat dye is indigo, which can be reduced to leuco-indigo.

EXAMPLE

Comparative Setup

An electrochemical reactor having an anolyte compartment and a catholyte compartment, which compartments are separated by a cation-exchange separator membrane of fluoropolymer (commercially available under the trademark NAFION) is used.

The anolyte compartment is formed by a stainless steel plate acting as anode, acting as feeder electrode, which forms one wall of the anolyte compartment and by the membrane of fluoropolymer which forms the opposite wall of the anolyte compartment. The dimensions of both anode and membrane are 12.5 cm by 40 cm, and the distance between membrane and anode is of 2 cm. The anolyte compartment has thus a volume of, 12.5×40×2 cm and an anolyte of aqueous 3 M NaOH solution is circulated.

The catholyte compartment is formed by a stainless steel plate acting as supply cathode for supplying the working cathode consisting of a dragged bed of carbon granules made from anode-grade coke with current. Depending on the direction of flow of the catholyte, the dragged bed is formed against the top or the bottom of the catholyte compartment. Each five minutes, the direction of flow is inverted. The stainless steel plate acting as feeder electrode forms one wall of the catholyte compartment and the membrane of fluoropolymer forms the opposite wall of the catholyte compartment. The dimensions of both supply cathode and membrane are 12.5 cm by 40 cm, and the distance between membrane and supply cathode is of 4 cm. The catholyte compartment has thus a volume of, 12.5×40×4 cm, in which an catholyte of aqueous 1.3 M NaOH solution containing 10 weight percent of particulate indigo is circulated at a flow rate of 1 l/min.

The potential applied between the anode and the supply cathode is increased until gaseous hydrogen is formed. The onset of hydrogen formation indicates the maximum permissible voltage at which the electrochemical cell can be operated to ensure that the main reaction, i.e. the reduction of indigo towards leuco-indigo, can be run efficiently and stably.

In this comparative setup, the voltage at which the hydrogen formation started was 2.6 V for a current of 20 A.

Inventive Setup

The same electrochemical reactor was used, except that the electrochemical reactor was equipped with a non-woven graphite textile (a felt) mat having a thickness of 5 mm on the cation-exchange membrane on the side facing the catholyte compartment, thereby impeding the granules of the working electrode to come into a proximity of less than essentially 5 mm of the membrane.

In this setup according to the present invention, the voltage at which the hydrogen formation started was 2.6 V for a current of 20 A.

It is apparent that the insertion of a spacer element made from an electrochemically inert material, such as a mat of carbon felt, preventing the granules of the working electrode from coming into proximity of the separator membrane, while at the same being electrically conductive and porous such as to allow for mass transfer allows to dramatically increase the performance of the electrochemical cell.

FIG. 1 shows the dependency of local electrode potential in mV with respect to the distance d in mm to the separator membrane for the comparative and the inventive setup.

As can be seen from FIG. 1, when no spacer element is used in the comparative setup, the local electrode potential reaches the local electrode potential of about 1000 mV for hydrogen production at a distance d of about 2 mm to the membrane. The used carbon granules of the working electrode, whose constituent material exhibits a hydrogen production activation overpotential of approximately 1000 mV will thus produce hydrogen at a distance of 2 mm to the membrane or closer. In this setup, the electrochemical reactor could be stably run at approximately 90% of the maximum settings of 20 A/2.6 V. As can further be seen from FIG. 1, in the farther regions of the electrode compartment the local electrode potential is lower and therefore mainly the wanted main reaction, i.e. the reduction of indigo, is carried out without hydrogen production on the used carbon granules of the working electrode.

In contrast, when a spacer element is used according to the inventive setup, the electrochemical reactor could be stably run at approximately 90% of the maximum settings of 36 A/3.3 V. As can be seen from FIG. 1, in said setup, the local electrode potential in the farther regions of the electrode compartment is relatively increased, which allows to increase amount of indigo turnover. However, at 36 A/3.3 V, the local electrode potential of about 1000 mV for hydrogen production is already reached at a distance d of about 4 mm and nears 1100 mV at 2 mm. This means that the problem of carbon granules of the working electrode, whose constituent material exhibits hydrogen production activation overpotential of approximately 1000 mV, is further exacerbated since they will produce hydrogen at a distance of 4 mm to the membrane or closer. However, by using a spacer element having a thickness of 5 mm, such as a carbon felt, on one hand the working electrode carbon granules are prevented from coming into a distance where the local electrode potential is at a level where hydrogen production would be reached by the carbon granules and on the other hand, the hydrogen production within 5 mm of the membrane carbon is avoided because the constituent material of the spacer element is electrochemically too inert. In other words, in the inventive setup, the local electrode potential is superior to the overpotential for production of hydrogen in the case of carbon granules, but is inferior to the overpotential needed for production of hydrogen in the case of the carbon felt.

Thus, an electrochemical reactor according to the inventive setup can in general be run more effectively than an electrochemical reactor according to the comparative setup.

LIST OF REFERENCE SIGNS

| | |
|---|---|
| 1 | electrode |
| 2 | separator membrane |
| 3 | electrolyte inlet |
| 4 | electrolyte compartment |
| 5 | spacer element |
| 6 | working electrode granules |
| 7 | electrolyte outlet |
| 8 | frame |
| 9 | gasket |
| 10 | electrochemical reator |

The invention claimed is:

1. An electrochemical reactor (10) for carrying out an electrochemical main reaction, said electrochemical reactor (10) comprising
at least one electrolyte compartment (4) comprising an aqueous electrolyte, wherein at least one of the side walls of said electrolyte compartment is an electrode or a feeder electrode (1) and an opposite side wall comprises or consist of a separator element (2),
a plurality of electrically conductive granules forming a working electrode (6) for the electrochemical main reaction in the electrolyte compartment (4) and enclosed in the electrolyte compartment (4), said granules comprising or consisting of a first material exhibiting at least a first activation overpotential for an electrochemical side reaction within a distance d from the separator element (2), characterized in that the electrochemical reactor (10) further comprises a spacer element (5) for maintaining the conductive granules at least at the distance d from the separator element (2) on at least the electrolyte-facing side of the separator element (2), wherein the spacer element (5) is electrically conductive and wherein the spacer element (5) comprises or consists of a second material exhibiting a second activation overpotential for the electrochemical side reaction within the distance d from the separator element (2) and wherein the second activation overpotential is larger than the first activation overpotential, and the electrochemical side reaction is either one of the half reactions of electrolysis of water.

2. The electrochemical reactor (10) for carrying out an electrochemical main reaction according to claim 1, wherein the electrochemical main reaction is the reduction of indigo to leuco-indigo.

\* \* \* \* \*